UNITED STATES PATENT OFFICE.

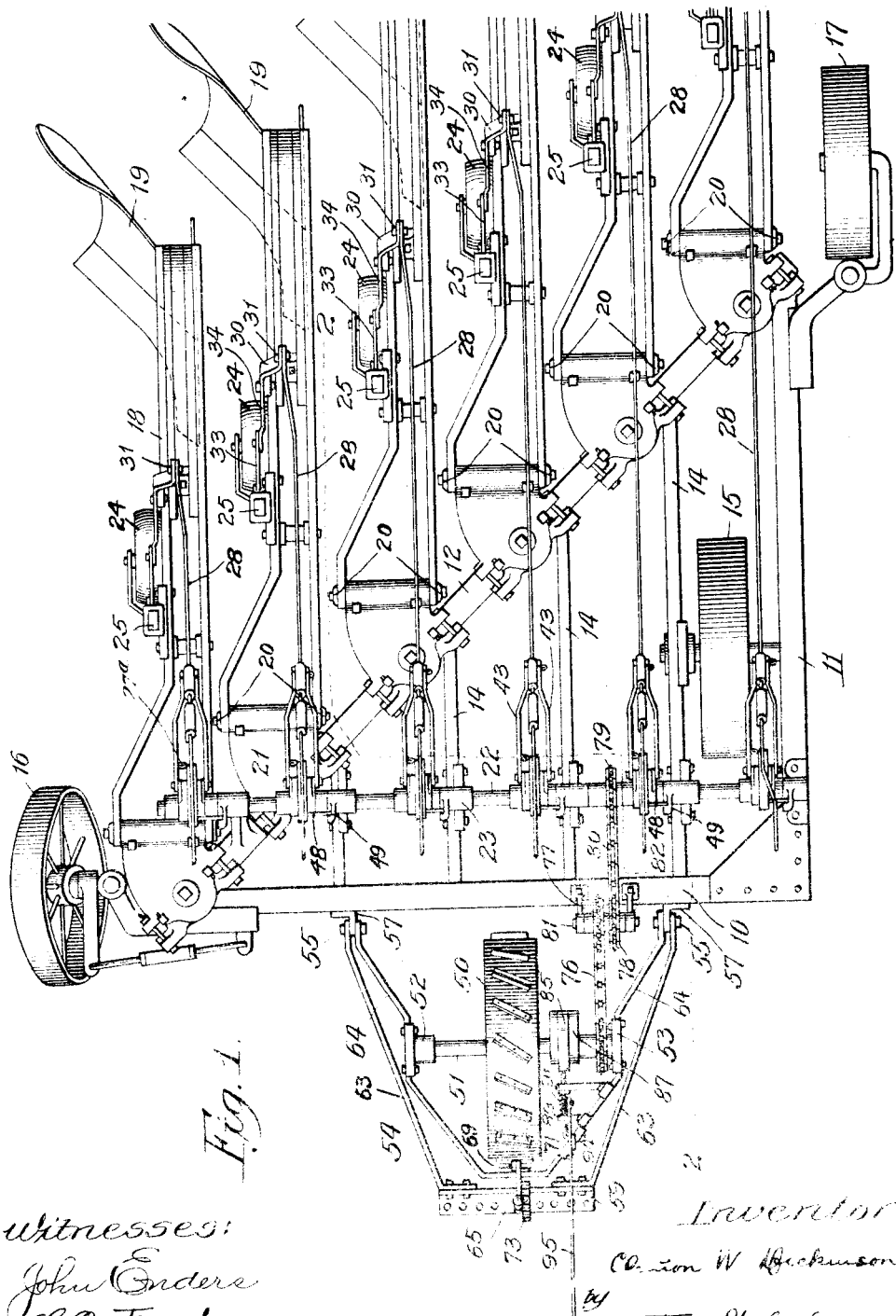

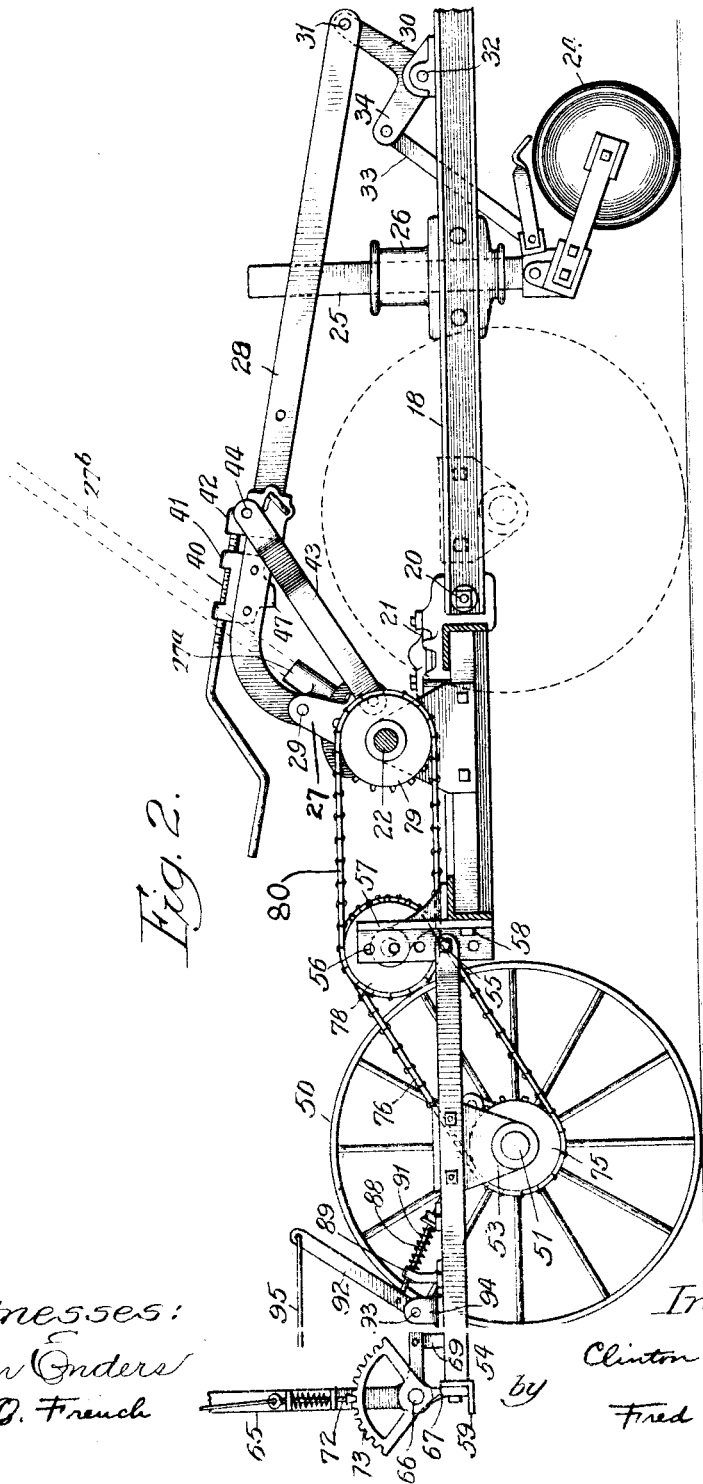

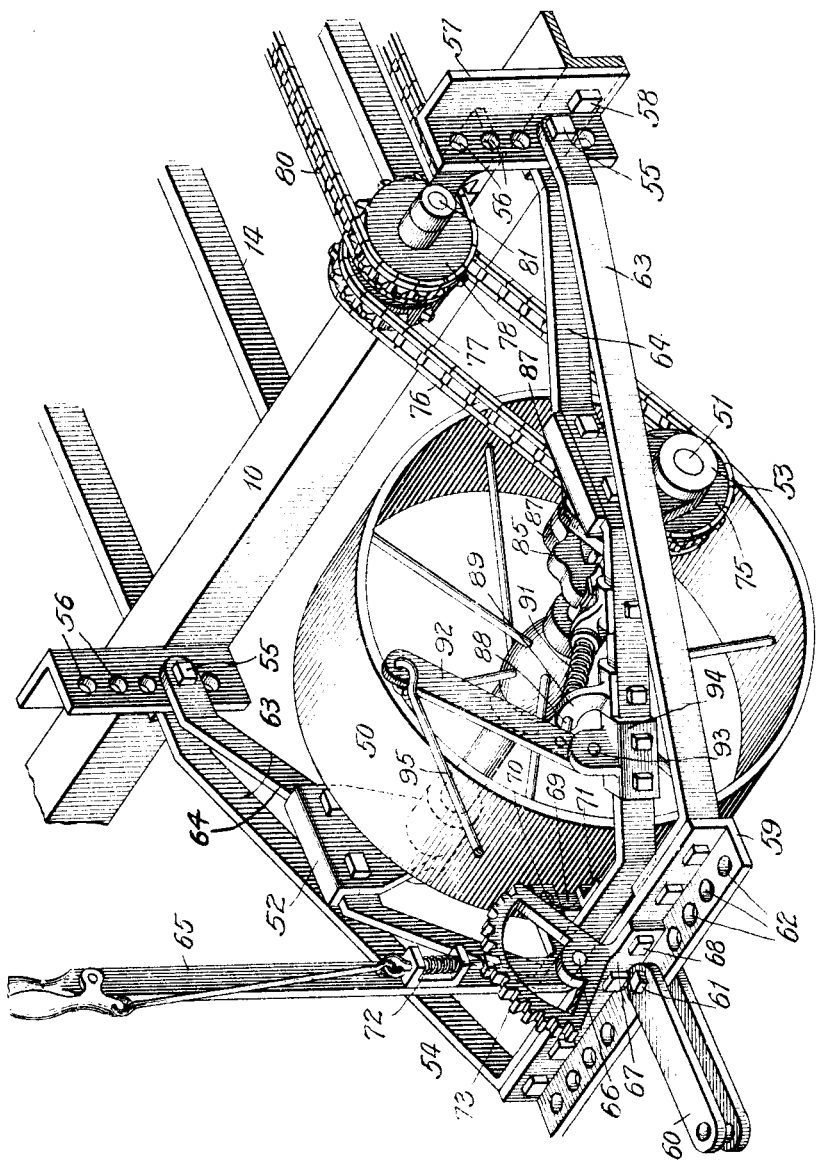

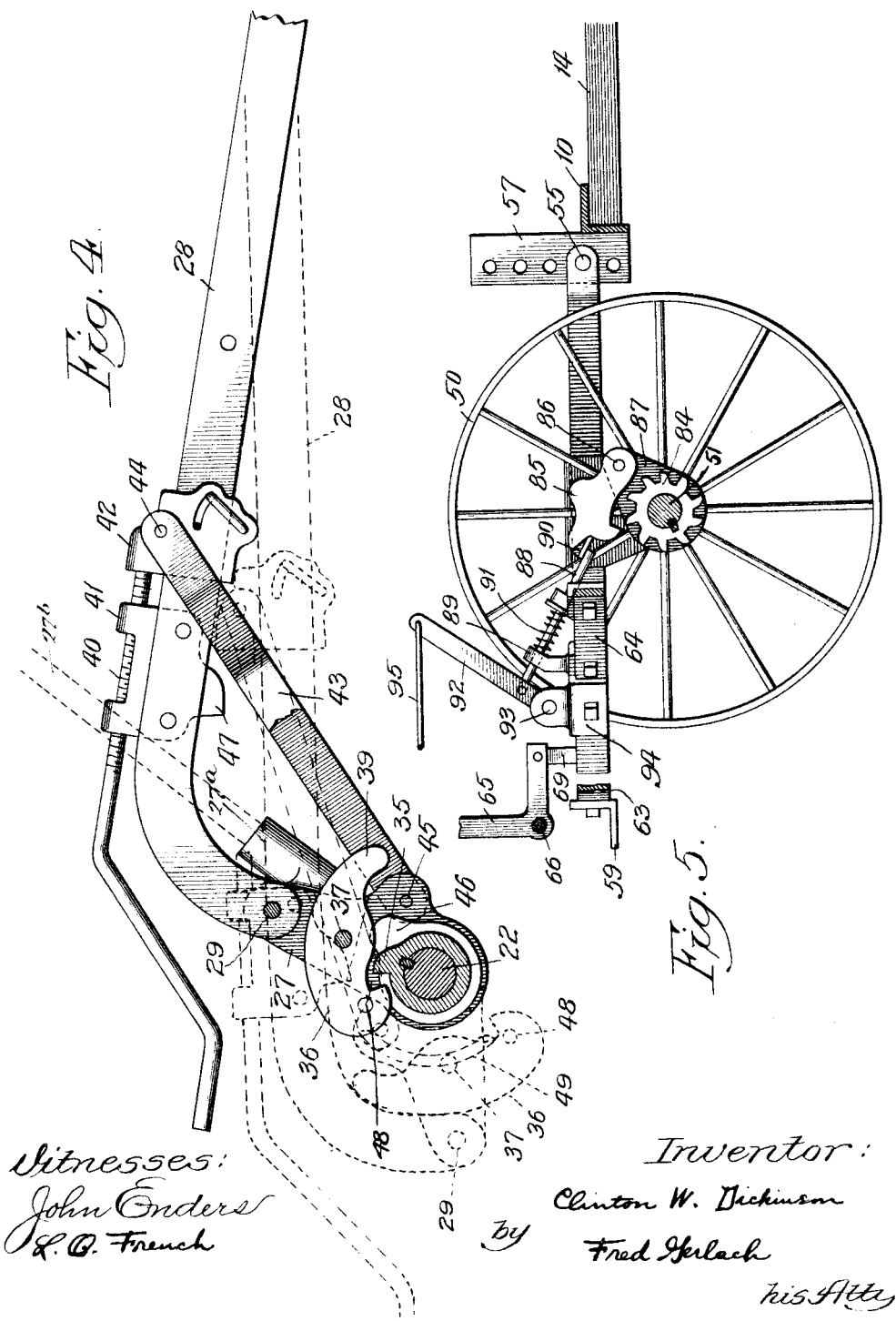

CLINTON W. DICKINSON, OF LA CROSSE, WISCONSIN.

AGRICULTURAL IMPLEMENT.

1,119,780.     Specification of Letters Patent.     Patented Dec. 1, 1914.

Application filed December 6, 1913. Serial No. 805,042.

*To all whom it may concern:*

Be it known that I, CLINTON W. DICKINSON, a resident of La Crosse, in the county of La Crosse and State of Wisconsin, have invented certain new and useful Improvements in Agricultural Implements, of which the following is a full, clear, and exact description.

The invention relates to tractor drawn implements and more particularly to that type in which operating mechanism is driven by a traction wheel.

It has heretofore been proposed to provide plow-shifting mechanism which was operatively connected to a traction-wheel. This traction-wheel usually served as a carrying-wheel for the frame and served to sustain a part of the load or frame, or was so disposed or connected to the frame so that it could perform the function of a carrying-wheel. The load imposed upon this traction-wheel was relied upon for the necessary traction which would cause the wheel to rotate in traveling over the ground, so that it would drive the plow-shifting or raising mechanism. In tractor-plows, particularly in those in which plowshares are separately raised or lowered, a number of adjustments are necessary to insure operation of the plowshare at the desired depth, to cause their bottoms to be disposed at the correct transverse and longitudinal angles. In some soils, greater pressure is necessary upon the traction-wheel than in others in order to obtain the requisite traction to operate the plow-shifting mechanism. If, however, attempt is made to adjust the traction-wheel relatively to the frame, variation of the position of the plow-supporting structure or frame relatively to the ground would tip the frame and correspondingly disturb the relation of the plowshares, particularly with respect to transverse and longitudinal inclination, so that readjustment would be necessary throughout the plow to rectify the variation resulting from adjustment between the frame and this traction wheel.

One object of the invention is to provide an improved implement in which variable pressure may be exerted upon the traction-wheel without disturbing the supporting structure and without necessitating any of the readjustments which would be necessary when an adjustable connection between the combined supporting and traction-wheel is made to attain the necessary traction. This object is attained by providing a traction-wheel which does not serve as a supporting wheel and which is capable of adjustment to vary its traction without disturbing the position of the plow supporting structure relatively to the ground and by interposing the traction wheel in the draft device, so that it will cause the traction-wheel to be pressed with the desired force into the ground. By mounting the traction-wheel in the draft-device, and by adjusting the draft-connection to the frame or at the tractor, the pressure of the traction-wheel upon the ground may be readily varied independently of the wheels which support and carry the supporting frame.

The other objects and advantages of the invention will be manifest from the detail description of a plow embodying an exemplification of the invention.

In the drawings: Figure 1 is a plan of a plow embodying the invention, parts being broken away. Fig. 2 is a vertical section taken on line 2—2 of Fig. 1. Fig. 3 is a perspective of the improved draft-device with the traction-wheel connected thereto and the mechanism for driving the plow-shifting mechanism from said wheel. Fig. 4 is a detail of one of the individual plow-shifting mechanisms. Fig. 5 is a side elevation, parts being broken away and shown in section, illustrating the controlling device for the clutch for driving the plow-shifting mechanism.

The invention is illustrated as applied to a plow which comprises a supporting frame which consists of a front cross-bar 10, a side bar 11, a diagonal bar 12, and longitudinal bars 14, all secured together in any suitable manner. This frame is sustained by a land-wheel 15 disposed in the frame and on an axle which is mounted in suitable bearings on the frame, a side furrow-wheel 16, and a trail wheel 17. These wheels may be connected to the frame in any suitable manner, as well understood in the art. A series of plow-beams 18 each carrying a plow-share 19, are arranged in diagonal succession, so that the plowshares will operate successively in the ground to turn each furrow slice into the furrow cut by the plowshare in advance thereof. Each plow-beam 18 is pivotally connected, as at 20, to a suitable adjustable coupling 21, which is secured to the diagonal frame-bar 12. A cross-shaft 22 is mounted in suitable bearings 23 on the frame and serves to operate the plow-shifting linkages. Each plow-beam is supported by a gage-wheel 24 which sustains a standard 25 which is slidably and rotatably held in a bracket 26 secured to the beam. A linkage is provided for raising and lowering each beam. Each of these linkages comprises an arm 27 pivoted on shaft 22, a link 28, having a curved front end pivoted, as at 29, to arm 27, a bell-crank lever 30, to which the rear end of link 28 is pivoted, as at 31, and which is pivoted at 32 to the plow-beam 18, and a link 33 pivoted to gage-wheel-standard 25 and to the arm 34 of lever 30. Each plow-shifting linkage is operated to raise its beam by a tooth 35, which is secured to rotate with shaft 22 and is adapted to engage a dog 36, which is pivoted, as at 37, to arm 27. When the plow is raised, the linkage is adapted to pass into dead-center relation, as indicated by dotted lines in Fig. 4, and will then be automatically locked in position to hold the beam and plow raised. The curved end of link 28 is adapted to strike the tail 39 of dog 36 to disengage the dog from tooth 35 when the beam has been raised. During each operation of shaft 22, it will make one complete revolution as hereinafter more fully set forth. The depth to which the plow will be lowered is controlled by a screw 40 which is mounted in a bracket 41 on link 28 and is adapted to engage a slide 42 on link 28, and a link 43 which is pivoted to slide 42, as at 44, and to arm 27 as at 45. A cam 46, rigid with shaft 22, is adapted to engage an abutment 47 on bracket 41 to shift the linkage across its dead-center and release the plow-beam so it will drop until arrested by the stop 42. A stud 48 on dog 36 is adapted to ride on a guide 49 to hold dog 36 out of the path of tooth 35 when the linkage is being operated to lower the plows.

The teeth 35 for operating the dogs 36 of the plow-shifting mechanisms, respectively, are set in rotative succession on shaft 22, so that the linkages will be operated to successively raise the plows out of the ground on a line transverse to the line of travel. Cams 46, for releasing the linkages to lower the plowshares, are also set in rotative succession on the shaft 22 so that the plows will be successively lowered into the ground on a line transverse to the line of draft. If the linkages are in the position shown by full lines in Fig. 4, one complete revolution of shaft 22 will cause the teeth 35 thereon to successively engage the dogs 36 until all of the linkages are automatically locked to hold the plows raised. If the linkages are in the position shown by dotted lines in Fig. 4, a complete revolution of shaft 22 will cause the cams 46 to successively strike abutments 47 and operate the linkages to release the plowshares and cause them to drop into the soil.

Each arm 27 is formed with a socket 27<sup>a</sup>, which is adapted to receive a rod or lever 27<sup>b</sup>, whereby the plow shifting mechanism may be operated by hand if desired.

The mechanism for driving the shaft 22 comprises a traction-wheel 50 which is secured to an axle 51 which is journaled in bearings 52 and 53. These bearings are secured to the draft-frame 54 which is pivotally connected to the plow-supporting frame by bolts 55, which are adapted to pass through either of a series of holes 56 in angle-bars 57 which are secured to the front rail 10 of the supporting frame by bolts 58. An angle-bar 59 is secured to the front of the draft frame and a draft-link 60 is hitched to said bar by a bolt 61. Bar 59 is provided with a series of holes 62, so that the draft-link may be adjusted laterally. By adjustment of the bolts 55 in holes 56, the pressure exerted upon traction-wheel 50 by the draft frame may be varied as desired. For example, by lowering bolts 55 without changing the point of hitch to the tractor, there will be more down-pull on the draft-frame 54 and greater pressure of the wheel 50 upon the ground. In some cases, adjustment of the connection to the draft-frame will suffice for practical purposes. In some instances, however, for example where soft spots are encountered, it might be desirable to provide an additional adjustment whereby the pressure may be varied more quickly and without stopping the operation of the plow and for this purpose, the draft-frame 54 is made up of an outer bail 63 to which the clevis-bar 59 is secured and an inner bail 64 to which the bearings 52 and 53 are secured, bolts 55 extending through the sides of both members of the frame to pivotally connect them to the vertical clevis-bars 59. A lever 65 is pivoted, as at 66, to a bracket 67 which is secured to the clevis-bar 59, as at 68. A link 69 is pivoted at 70 to a lug 71, which is secured to the front of draft-member 64 and to lever 65. Lever 65 is provided with a lock-bolt 72 for engaging a segmental rack 73 on the bracket 67. This lever 65 and link 69 serve as an adjustable connection between the draft-members for relatively lowering that member in which the traction-wheel 50 is mounted to force said wheel onto the ground with more or less pressure as desired. By mounting this traction-wheel in the draft-frame, the pressure of the wheel may be adjusted so that the draft will force it into contact with the ground with more or less pressure independently of the plow-carrying frame. In other words, more or less traction may be obtained for this traction-wheel 50 without raising or lowering any part of the plow-supporting structure, so that no readjustment of the frame or the plows is necessary when the pressure of the traction wheel is varied.

Traction-wheel 50 is utilized to drive shaft 22 to shift the linkages for operating the plow-beams. The driving-connection between the axle 51 of traction-wheel 50 and shaft 22 comprises a sprocket wheel 75 which is loose on said axle, a sprocket wheel 77 which is mounted on a short shaft 81 approximately co-axial with the point about which the draft-device swings (bolts 55), a sprocket chain 76 between sprocket wheels 75, 77, a sprocket wheel 78 rotating with sprocket 77, a sprocket wheel 79 fixed to shaft 22 and a sprocket chain 80 between sprocket wheels 78 and 79. Shaft 81 is mounted in brackets 82 which are secured to the front rail 10 of the supporting frame. By providing a driving-connection including the rotating sprocket wheels 77 and 78 disposed substantially in co-axial relation with the pivotal connection between the draft frame 54 and the supporting frame, adjustment of the traction-wheel or pivotal movement of the draft-frame will not materially effect the operation of the chain 76. A ratchet wheel 84 is secured to rotate constantly with axle 51 and a dog 85 pivotally connected, as at 86, to an arm 87, is adapted to engage the ratchet and to be operated thereby to cause arm 87, which is fixedly connected to sprocket 53, to be rotated. Ratchet 84 and dog 85 serve as a clutch for operating the driving-connection for shaft 22. The operation of this clutch is controlled by the rod 88 which is slidably mounted in guides 89 on the draft-member 64 and is normally held in the path of an abutment 90 on dog 85 by a spring 91. Rod 88 is suitably connected to a lever 92 which is pivoted as at 93 to a bracket 94 on the draft-member 64 and a wire or cable 95 extends from the upper end of this lever to a point within convenient reach of the operator on the tractor.

In operation, a pull upon cable 95 will withdraw rod 88 from the path of dog 85, so that the latter will drop into engagement with a ratchet 84 and be operated thereby one complete revolution at the end of which, rod 88 will have been restored to the path of abutment 90 on dog 85 to disengage the dog from the ratchet. A complete revolution of dog 85 will impart one revolution to sprocket wheel 75, which, by means of the sprocket chain connection, will drive shaft 22 one complete revolution. If the plows are lowered in the ground, the beam-shifting connections will be in position shown by full lines in Fig. 4 and teeth 35 on shaft 22 will operate the dogs 36 to raise the plow-beams until the linkages will be automatically locked in raised position. If the plow-beams are in raised position, as indicated by dotted lines in Fig. 4, a revolution of shaft 22 will cause cams 46 to strike abutment 47 and shift the linkages across their dead-center to release and lower the beams.

The structure described exemplifies mechanism in which the power taken from a traction-wheel operates the beam-shifting mechanism to alternately raise and lower the beams. The invention thus exemplifies a tractor-drawn implement in which an operating shaft or mechanism is mounted on a structure supported by carrying wheels and in which the traction-wheel for driving said shaft or mechanism is connected to the draft appliance. The invention also exemplifies an improved tractor plow in which a traction-wheel from which power is derived for driving the beam-shifting mechanism may be adjusted to vary its pressure upon the ground independently of the supporting-wheels and frame. It also exemplifies mechanism in which the traction-wheel for driving the beam shifting mechanism is disposed in or connected to the draft-connection or frame. It also exemplifies a draft-frame to which the traction-wheel is connected which may have its connection and supporting frame adjusted. It also exemplifies a machine in which the pressure of the traction-wheel may be quickly adjusted by means of a lever which may be locked in different positions. It also exemplifies a machine in which the pressure regulating means for the traction-wheel is disposed close to the tractor where the operator on the tractor may readily make the necessary adjustment from the tractor. By supporting the traction-wheel in the draft-device, the necessity of providing an additional frame for the traction wheel is obviated.

While the invention has been illustrated as embodied in a plow, it will be understood that certain broad features thereof may be utilized in other agricultural implements in which the power derived from a traction-wheel is employed to drive a shaft or mechanism on the carrying-frame.

The invention is not to be understood as restricted to the details set forth, since these may be modified within the scope of the appended claims without departing from the spirit and scope of the invention.

Having thus described the invention, what I claim as new and desire to secure by Letters Patent, is:

1. In an agricultural implement, the combination of a supporting-structure, carrying-wheels on which said structure is mounted, operating mechanism on the structure, a draft-device, a traction-wheel connected to said draft-device and held upon the ground thereby, a driving-connection between the traction-wheel and said operating means whereby the latter will be driven, and a flexible connection between the draft-device and the supporting-structure.

2. In an agricultural implement, the combination of a supporting-structure, carrying-wheels on which said structure is mounted, operating mechanism on the structure, a draft-device, a traction-wheel connected to said draft-device and held upon the ground thereby, a driving-connection between the traction-wheel and said operating-means whereby the latter will be driven, and a flexible and vertically adjustable connection between the draft-device and the supporting-structure.

3. In an agricultural implement, the combination of a supporting-structure, carrying-wheels on which said structure is mounted, operating mechanism on the structure, a draft-device connected to the structure, a traction-wheel connected to said draft-device and held upon the ground thereby, a driving-connection between the traction-wheel and said operating-means whereby the latter will be driven, and a vertically adjustable pivotal connection between the draft-device and the supporting-structure.

4. In an agricultural implement, the combination of a supporting-structure, carrying-wheels on which the structure is mounted, a shaft mounted on the structure, a draft-device, a traction-wheel connected to said draft-device and held upon the ground thereby, a connection operated by said traction-wheel for driving said shaft, and a flexible connection between the draft-device and the supporting-structure.

5. In an agricultural implement, the combination of a supporting-structure, carrying-wheels on which the structure is mounted, a shaft mounted on the structure, a draft-device, a traction-wheel connected to said draft-device and held upon the ground thereby, a connection operated by said traction-wheel for driving said shaft, and a vertically adjustable flexible connection between the draft-device and the supporting structure.

6. In an agricultural implement, the combination of a supporting structure, carrying-wheels on which the structure is mounted, a shaft mounted on the structure, a draft-device, a traction-wheel connected to said draft-device and held upon the ground thereby, a connection operated by said traction wheel for driving said shaft, and a vertically adjustable pivotal connection between the draft-device and the supporting structure, whereby the pressure upon the traction-wheel may be varied.

7. In an agricultural implement, the combination of a supporting-structure, carrying-wheels on which the structure is mounted, a shaft mounted on the structure, a draft-device, a traction-wheel connected to said draft-device and held upon the ground thereby, a connection operated by said traction-wheel, for driving said shaft, a flexible connection between the draft-device and the supporting-structure, and means for rendering the connection inoperative to drive the shaft when the traction-wheel is on the ground.

8. In an agricultural implement, the combination of a supporting-structure, carrying-wheels on which the structure is mounted, a shaft mounted on the structure, a draft-device, a traction-wheel connected to said draft-device and held upon the ground thereby, a connection operated by said traction-wheel for driving said shaft, a vertically adjustable flexible connection between the draft-device and the supporting-structure, and means for rendering the connection inoperative to drive the shaft when the traction-wheel is on the ground.

9. In an agricultural implement, the combination of a supporting-structure, carrying-wheels on which the structure is mounted, a shaft mounted on the structure, a draft-device, a traction-wheel connected to said draft-device and held upon the ground thereby, a connection operated by said traction-wheel for driving said shaft, a vertically adjustable, pivotal connection between the draft-device and the supporting structure, whereby the pressure of the traction-wheel on the ground may be varied, and means for rendering the connection inoperative to drive the shaft when the traction-wheel is on the ground.

10. In an agricultural implement, the combination of a supporting-structure, carrying-wheels on which the structure is mounted, operating-mechanism on the structure, a frame projecting forwardly from, and having its rear end pivoted to the structure, a traction-wheel connected to said frame, and held upon the ground thereby, and a driving-connection between the traction-wheel and said operating mechanism whereby the latter will be driven.

11. In an agricultural implement, the combination of a supporting structure, carrying-wheels on which said structure is mounted, a plowshare, mechanism for shifting the plowshare, a draft-device connected to the structure, a traction-wheel connected to said draft-device and a connection operated by said traction-wheel, for driving said mechanism.

12. In an agricultural implement, the combination of a supporting structure, carrying-wheels on which said structure is mounted, a plowshare, mechanism for shifting the plow-share, a draft-device flexibly connected to the structure, a traction-wheel connected to said draft-device and a connection operated by said traction-wheel, for driving said mechanism.

13. In an agricultural implement, the combination of a supporting-structure, carrying-wheels on which said structure is mounted, a plowshare, mechanism for raising the plowshare, a draft-device connected to the structure, a traction-wheel connected to said draft-device and a connection operated by said traction-wheel, for driving said mechanism.

14. In an agricultural implement, the combination of a supporting-structure, carrying-wheels on which said structure is mounted, a plowshare, mechanism for raising the plowshare, a draft-device flexibly connected to the structure, a traction-wheel connected to said draft-device and a connection operated by said traction-wheel, for driving said mechanism.

15. In an agricultural implement, the combination of a supporting-structure, carrying-wheels on which said structure is mounted, a plowshare, mechanism for lowering the plowshare, a draft-device connected to the structure, a traction-wheel connected to said draft-device, and a connection operated by said traction-wheel, for driving said mechanism.

16. In an agricultural implement, the combination of a supporting-structure, carrying-wheels on which said structure is mounted, a plowshare, mechanism for lowering the plowshare, a draft-device flexibly connected to the structure, a traction-wheel connected to said draft-device, and a connection operated by said traction-wheel, for driving said mechanism.

17. In an agricultural implement, the combination of a supporting-structure, carrying-wheels therefor on which said structure is mounted, a plowshare, mechanism for raising and lowering the plowshare, a draft-device connected to the structure, a traction-wheel connected to said draft-device, and a connection operated by said traction-wheel, for operating said mechanism.

18. In an agricultural inplement, the combination of a supporting structure, carrying-wheels therefor on which said structure is mounted, a plowshare, mechanism for raising and lowering the plowshare, a draft-device flexibly connected to the structure, a traction-wheel connected to said draft-device and a connection operated by said traction-wheel for operating said mechanism.

19. In an agricultural implement, the combination of a supporting structure, carrying-wheels on which said structure is mounted, a plowshare, mechanism for shifting the plowshare, a draft-device, a traction-wheel connected to said draft-device, a connection operated by said traction-wheel for driving said mechanism, and a vertically adjustable connection for the draft-device.

20. In an agricultural implement, the combination of a supporting-structure or frame, carrying-wheels on which said structure is mounted, a plowshare, mechanism for shifting the plowshare, a draft-device connected to the structure, a traction-wheel on said draft-device, a connection operated by said traction-wheel, for driving said mechanism, and an adjustable connection between the traction-wheel and the draft-device.

21. In an agricultural implement, the combination of a supporting-structure, carrying-wheels on which said structure is mounted, a plowshare, mechanism for shifting the plowshare, a draft-device flexibly connected to the structure, a traction-wheel on said draft-device, a connection operated by said traction-wheel for driving said mechanism, and an adjustable connection between the traction-wheel and the draft-device.

22. In an agricultural implement, the combination of a supporting-structure, carrying-wheels on which said structure is mounted, a plowshare, mechanism for shifting the plowshare, a draft-device connected to the structure, a traction-wheel connected to said draft-device, a connection operated by said traction-wheel for driving said mechanism, and an adjustable connection between the traction-wheel and the draft-device, comprising a lever.

23. In an agricultural implement, the combination of a supporting structure, carrying-wheels on which said structure is mounted, a plowshare, mechanism for shifting the plowshare, a draft-device, a traction-wheel on said draft device, a connection operated by said traction-wheel for driving said mechanism, a vertically adjustable connection between the draft-device and the supporting-structure, and an adjustable connection between the traction-wheel and the draft-device.

24. In an agricultural implement, the combination of a supporting-structure, carrying-wheels on which said structure is mounted, a plowshare, mechanism for shifting the plowshare, a draft-device, a traction-wheel on said draft-device, a connection operated by said traction-wheel for driving said mechanism, a vertically adjustable pivotal connection between the draft-device and the supporting structure, and an adjustable connection between the traction-wheel and the draft-device.

25. In an agricultural implement, the combination of a supporting structure, carrying-wheels on which said structure is mounted, a plowshare, mechanism for shifting the plowshare, a draft-device connected to the structure, a traction-wheel on said draft-device, a connection operated by said traction-wheel for driving said mechanism, and an adjustable connection between the traction-wheel and the draft-device, comprising a hand lever and means for locking the lever.

26. In an agricultural implement, the combination of a supporting-structure, carrying-wheels on which said structure is mounted, operating-mechanism mounted on the structure, a draft-device connected to the structure, a traction-wheel carried by said draft-device, and a connection operated by said traction-wheel for driving said mechanism, said connection comprising a clutch.

27. In an agricultural implement, the combination of a supporting structure, carrying-wheels on which said structure is mounted, operating-mechanism mounted on the structure, a draft-device flexibly connected to the structure, a traction-wheel carried by said draft-device, and a connection operated by said traction-wheel for driving said mechanism, said connection comprising a clutch.

28. In an agricultural implement, the combination of a supporting structure, carrying-wheels on which said structure is mounted, operating-mechanism mounted on the structure, a draft-device flexibly and adjustably connected to the structure, a traction-wheel carried by said draft-device, and a connection operated by said traction-wheel for driving said mechanism, said connection comprising a clutch.

29. In an agricultural implement, the combination of a supporting-structure, carrying-wheels therefor, a series of plow-carrying-beams pivotally connected to the structure, a beam-operating shaft mounted on said structure, a traction-wheel flexibly connected to the structure, a driving-connection between the traction-wheel and said shaft comprising a clutch, and an automatic throw-out for the clutch.

30. In an agricultural implement, the combination of a supporting-structure, carrying-wheels therefor, a series of plow-carrying beams pivotally connected to the structure, a beam-shifting shaft mounted on said structure, a traction-wheel flexibly and adjustably connected to the structure, a driving-connection between the traction-wheel and said shaft comprising a clutch and an automatic throw-out for the clutch.

31. In an agricultural implement, the combination of a supporting-structure, carrying-wheels therefor, a series of plow-carrying beams pivotally connected to the structure, a shaft mounted on said structure, beam-shifting mechanisms operatively connected to said shaft, a traction-wheel flexibly connected to the structure, a driving-connection between the traction-wheel and said shaft comprising a clutch and an automatic throw-out for the clutch.

32. In an agricultural implement, the combination of a supporting-structure, carrying-wheels for the structure, plow-beams pivoted to the structure, operating-mechanism on the structure for the beams, a traction-wheel flexibly connected to the structure, means for holding the traction-wheel on the ground without locking said flexible connection, a driving-connection between the traction-wheel and the operating-mechanism, and means for rendering the shifting-mechanism inoperative while the traction-wheel is rotating.

33. In an agricultural implement, the combination of a supporting-structure, carrying-wheels for the structure, plow-beams movably connected to the structure, mechanism for shifting the beams mounted on the structure, a traction-wheel flexibly and adjustably connected to the structure, means for holding the traction-wheel on the ground without locking said flexible connection, a driving-connection between the traction-wheel and the beam-shifting mechanism, and means for rendering the shifting-mechanism inoperative while the traction-wheel is rotating.

34. In an agricultural implement, the combination of a supporting-structure, carrying-wheels for the structure, a series of plow-beams each pivoted to the structure, a shaft mounted on the structure, beam-shifting mechanism operable by said shaft, a traction-wheel flexibly connected to the structure, means for holding the traction-wheel on the ground while the flexible connection is operative, a driving-connection between the traction-wheel and said shaft, and means for rendering the shaft inoperative by the traction-wheel when the latter is rotating.

35. In an agricultural implement, the combination of a supporting-structure, carrying-wheels for the structure, a series of plow-beams each pivoted to the structure, a shaft mounted on the structure, beam-shifting mechanism operable by said shaft, a traction-wheel flexibly and adjustably connected to the structure, means for holding the traction-wheel on the ground while the flexible connection is operative, a driving-connection between the traction-wheel and said shaft, and means for rendering the shaft inoperative by the traction-wheel when the latter is rotating.

36. In an agricultural implement, the combination of a supporting-structure, carrying-wheels on which said structure is mounted, operating mechanism mounted on the structure, a traction-wheel, a shaft for said wheel flexibly connected to the structure and a connection operated by said traction-wheel for driving said mechanism, comprising a clutch on said shaft.

37. In an agricultural implement, the combination of a supporting-structure, carrying-wheels on which said structure is mounted, operating mechanism mounted on the structure, a traction-wheel, a shaft for said wheel, a flexible and adjustable connection between said shaft and said structure, a clutch on said shaft and a flexible connection for driving said mechanism from said clutch.

38. In an agricultural implement, the combination of a supporting - structure, carrying-wheels on which said structure is mounted, operating-mechanism mounted on the structure, a draft-device flexibly connected to the structure, a traction-wheel, a shaft for said wheel carried by said draft-device, a clutch on said shaft, and a driving connection between said clutch and the operating mechanism.

39. In an agricultural implement, the combination of a supporting - structure carrying-wheels on which said structure is mounted, operating mechanism mounted on the structure, a draft-device flexibly connected to the structure, a traction-wheel, a shaft for said wheel carried by said draft-device, a clutch on said shaft, and a flexible driving connection between said clutch and the operating mechanism.

40. In an agricultural implement, the combination of a supporting - structure, carrying-wheels on which the structure is mounted, operating-mechanism mounted on the structure, a draft-device, a traction-wheel connected to said draft-device and held upon the ground thereby, a connection operated by said traction-wheel for driving said shaft, a flexible connection between the draft-device and the supporting-structure, means for rendering the driving connection inoperative to drive the shaft when the traction-wheel is on the ground, and means mounted on the draft-device for controlling the operation of the connection operated by the traction-wheel.

41. In an agricultural implement, the combination of a supporting - structure, carrying-wheels on which the structure is mounted, operating-mechanism mounted on the structure, a draft-device, a traction-wheel connected to said draft-device and held upon the ground thereby, a connection operated by said traction-wheel for driving said shaft, a flexible connection between the draft-device and the supporting-structure, a clutch for controlling the operation of the driving-connection operated by the traction-wheel, and controlling-means for the clutch, said clutch and controlling-means being mounted on the draft-device.

42. In an agricultural implement, the combination of a supporting-structure, carrying-wheels on which the structure is mounted, a draft-device, connected to the structure, a traction-wheel connected to said draft-device and held upon the ground thereby, operating-mechanism mounted on the structure, a connection operated by said traction-wheel for driving said operating-mechanism, and a pressure-adjusting lever for the traction-wheel mounted on said draft-device.

43. In an agricultural implement, the combination of a supporting-structure, carrying-wheels for the structure, operating-mechanism mounted on the structure, a draft-bail connected to the front of the structure and adapted to be connected to a tractor, a traction-wheel disposed in and connected to the bail, and a driving-connection between the traction-wheel and the operating-mechanism.

44. In an agricultural implement, the combination of a supporting - structure, carrying-wheels for the structure, operating-mechanism mounted on the structure, a draft-bail pivotally connected to the front of the structure and adapted to be connected to a tractor, a traction-wheel disposed in and connected to the bail, and a driving-connection between the traction-wheel and the operating-mechanism.

45. In an agricultural implement, the combination of a supporting - structure, carrying-wheels for the structure, operating-mechanism mounted on the structure, a plurality of bails pivotally connected to the front of the structure and adapted to be connected to a tractor, a traction-wheel mounted in one of the bails and connected thereto, and a driving-connection between the traction-wheel and the operating mechanism.

CLINTON W. DICKINSON.

Witnesses:
C. H. WOODRUFF,
R. D. FENTRESS.